United States Patent [19]

Du

[11] Patent Number: 5,421,794

[45] Date of Patent: Jun. 6, 1995

[54] EASY-TO-ASSEMBLE EXERCISE BIKE

[75] Inventor: Lin Du, Zhaoqing, China

[73] Assignee: Yong Tong Industrial Co., Zhaoqing, China

[21] Appl. No.: 988,764

[22] Filed: Dec. 10, 1992

[30] Foreign Application Priority Data

Jul. 7, 1992 [CN] China .............................. 92 2 26634.4

[51] Int. Cl.$^6$ ........................ A63B 23/00; B62M 1/04
[52] U.S. Cl. ........................................ 482/57; 482/51; 280/221
[58] Field of Search .................... 482/57, 66, 51, 68, 482/148; 128/60; 280/221

[56] References Cited

U.S. PATENT DOCUMENTS

| 4,329,981 | 5/1982 | Dungl | 128/60 |
| 4,741,527 | 5/1988 | Nestegard | 482/62 |
| 4,826,159 | 5/1989 | Hersey | 482/146 |
| 5,129,664 | 7/1992 | Chen | 280/221 |

FOREIGN PATENT DOCUMENTS 88217282.4  7/1989  China .
90201506.0  10/1990  China .

OTHER PUBLICATIONS

Abstract of Patent Publication No. SU 1558–416–A, dated Apr. 23, 1990, inventor Yu Gurkin, entitled "Self-propelled Board and Roller System"; from Derwent Publications Ltd., 1991.

Abstract of Patent Publication No. SU 1602–567–A, dated Oct. 30, 1990, inventor Yu Gurkin, entitled "Roller Platform Transport Unit"; from Derwent Publications Ltd., 1991.

Primary Examiner—Stephen R. Crow
Attorney, Agent, or Firm—Merchant, Gould, Smith, Edell, Welter & Schmidt

[57] ABSTRACT

An exercise bike, comprising two footboards, six wheels, and four straight shafts with trapezoid-headed ends, is provided. Symmetrically arranged in the disk of each wheel are two eccentrical trapezoid apertures. The ends of the shafts are orthogonally inserted into the trapezoid apertures of the wheels, to form a wheel frame, thus avoiding the possibility of assembling the exercise bike improperly. The wheels are arranged in three lines, and the middle portions of the shafts are supported by bearings at the bottom of the boards and can rotate freely thereon. The bike can further be assembled into a safety-type exercise bike, or a massage-type one. When the footboards are threaded, the bike will move forward in a fluctuating manner. The various parts can leave the factory in separate packages for the customers to assemble on their own. The products can therefore be transported in large quantities and over long distances.

8 Claims, 8 Drawing Sheets

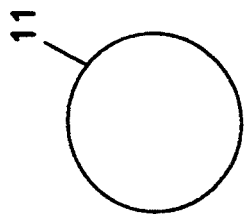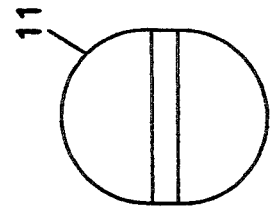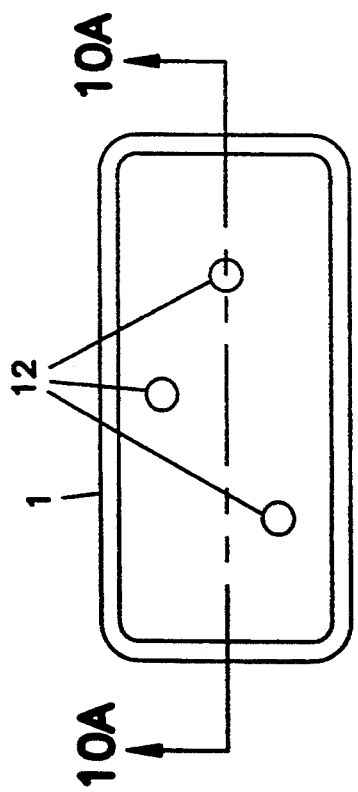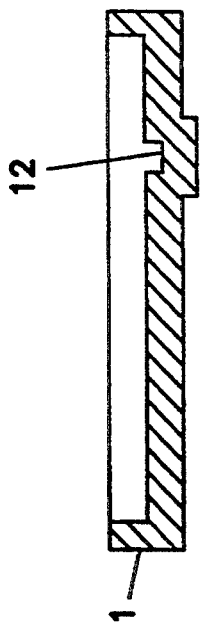

1

EASY-TO-ASSEMBLE EXERCISE BIKE

BACKGROUND OF THE INVENTION

The present invention relates to a new exercise bike with two footboards. It is foot-pedalled and moves forward in a fluctuating manner.

Exercise bikes that appeared in recent years are mainly meant for sport and competition, both for entertainment and body building. The construction of an exercise bike can apply the principle of loose-fitting between a crank shaft and its base. This, however, requires a high material hardness and a high manufacture precision of the shaft and its base; and the bike is, therefore, difficult to produce. The bike will not operate properly even if there is very slight transformation. Besides, the so-called "massage function" is actually done in a "finger-pressing" manner, which cannot produce the desired effects on acupuncture points. According to the Theory of Jing and Lo (channels and collaterals), finger-pressing is far less effective than "rotating massage". Another exercise bike, disclosed in another utility model CN 90 2 1506.0, announced on Oct. 10, 1990, avoided the defect of using a crank shaft, and can be made entirely of plastics. In the construction of that exercise bike, a straight square-headed shaft instead of a crank shaft is used. The square end of the shaft is fitted tightly into a corresponding eccentric square aperture made in the disk of a wheel. Compared with the aforementioned bike having a crankshaft, it has the advantages of being easy to produce, stronger in structure and handy in use. Nevertheless, both bikes have the same safety problem, that is, a beginner not used to riding such bikes may fall down because of sudden pedalling. There are several types of bikes utilizing a straight square-headed shaft, comprising three wheels, four wheels, or six wheels. The six-wheeled bike consists of six wheels, two footboards, four square-headed shafts and eight half bushes. The square heads of the shafts are inserted orthogonally into the corresponding eccentric apertures in the wheels. Two wheels are provided on each of both the right side and left side of the bike, and each wheel has two apertures provided therein. One end of a shaft is inserted into one of the two apertures of each wheel. Two wheels are provided in the middle, each of which has two apertures. Likewise, one end of a shaft is inserted into one of said two apertures of each of the middle wheels. During assembly, both ends of a shaft must be properly inserted into the corresponding apertures of the corresponding wheels. If they are inserted improperly, for example, as in FIG. 3(i a) the bike cannot be properly assembled. The correct assembling is shown in FIG. 3(b). Since a joint between a shaft and a wheel is fitted tightly, it would be difficult to pull out an improperly inserted shaft without causing damage thereto. So, if all the parts of the bike are packed and transported in separate packages to be assembled by a user (i.e., customer), the customer may render a bike useless by making a mistake in assembling, since most customers are not experienced in assembling such bikes. To obviate such problems, a solution would be to sell assembled bikes as the final product. However, such assembled bikes would take up to much space in transportation and are inconvenient to carry. The high cost in packaging and transportation limits sending large quantities of goods (i.e., bikes) over long distances and, therefore, prevents popularizing the products of the greatest invention.

OBJECT OF INVENTION

The object of the present invention is to avoid the above-mentioned technological shortcomings and provide the customers with a product that is easy to assemble, suitable for separate packaging and long-distance transportation, as well as having general and multi-purpose use.

BRIEF DESCRIPTION OF DRAWINGS

The above object of the present invention, as well as other advantages, will become clear through the following detailed description, with reference to the accompanied drawings, wherein:

FIG. 10 is a top view of a footboard and of the present invention, and FIG. 10A is a sectional view thereof taken along section line 10A—10A;

FIG. 11 is a top plan view of a massage lump of the present invention, and FIG. 11A is a side elevational view thereof.

DESCRIPTION OF INVENTION

The object of the present invention can be attained through the following measures.

Figure 1:
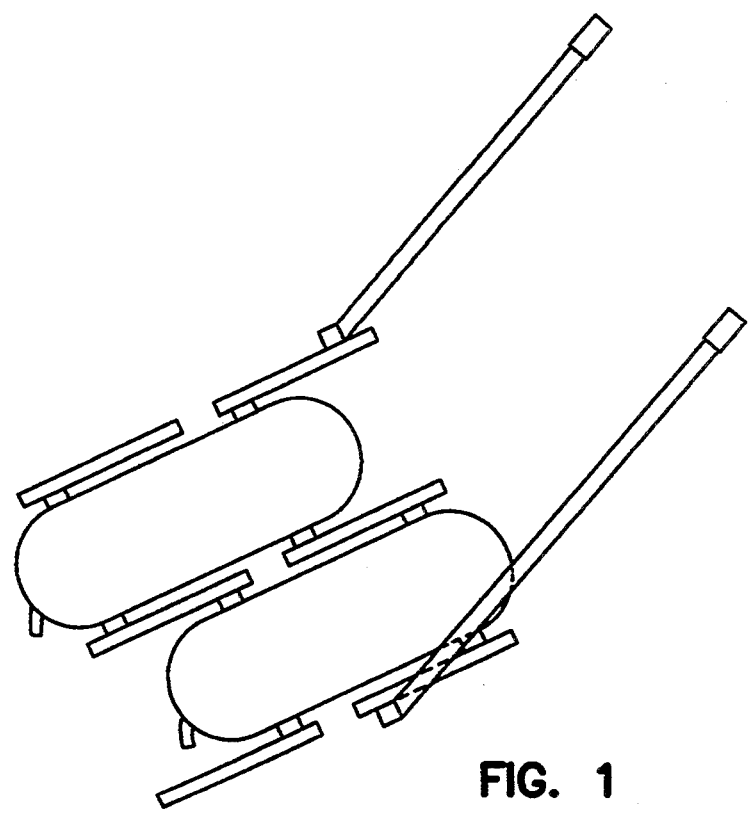
FIG. 1 is a perspective view of the present exercise bike.
Figure 2:
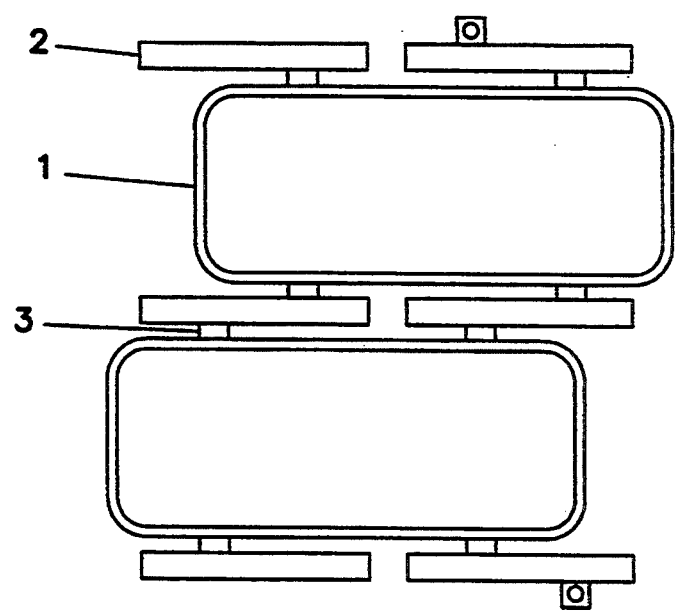
FIG. 2 is a top view of the present bike.
Figure 3A:
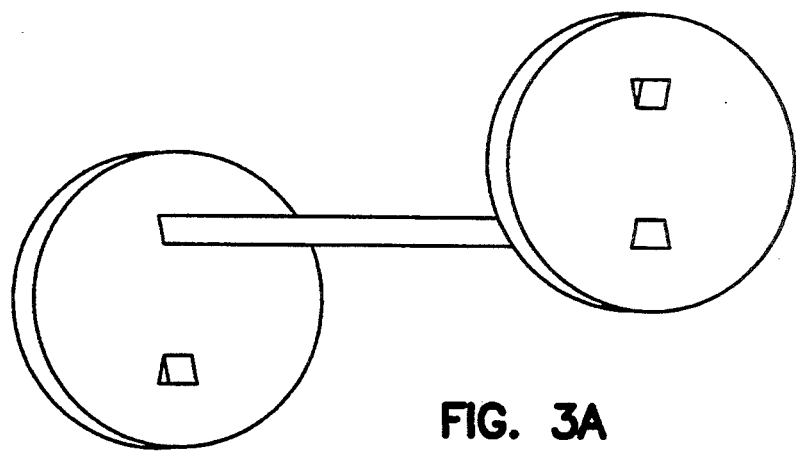
FIG. 3(a) shows an improperly assembled set of shaft and wheels.
Figure 3B:
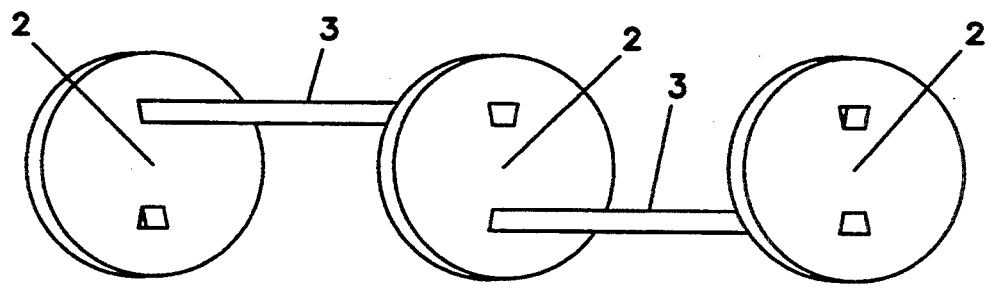
FIG. 3(b) is a schematic illustration showing how one group of shafts and wheels of the present bike are assembled.
Figure 3C:
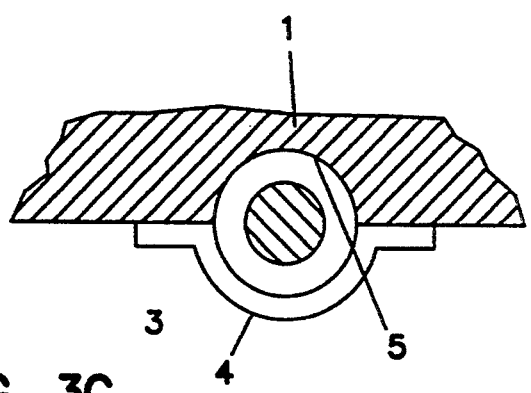
FIG. 3(c) shows one method of how the straight shafts are coupled to the bottom of the footboards.
Figure 4:
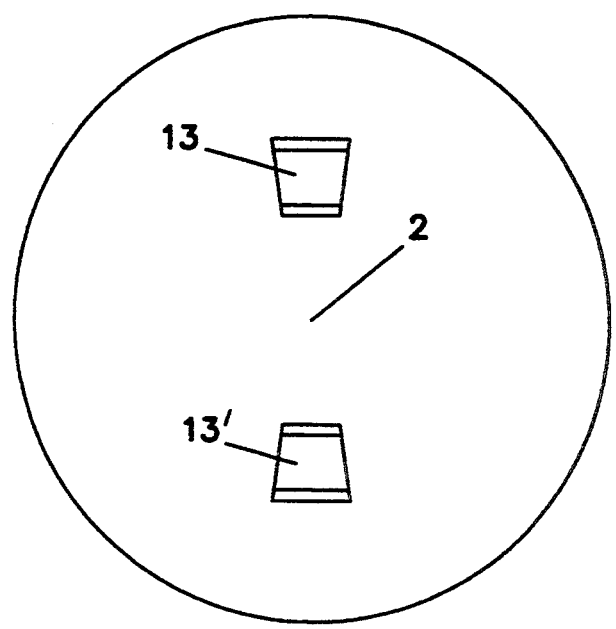
FIG. 4 shows the locations of said trapezoid-shaped apertures in a wheel.
Figure 5A:
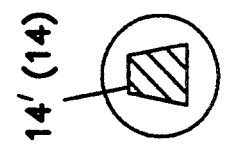
FIG. 5A is a sectional view thereof taken along section line 5A—5A.
Figure 5:
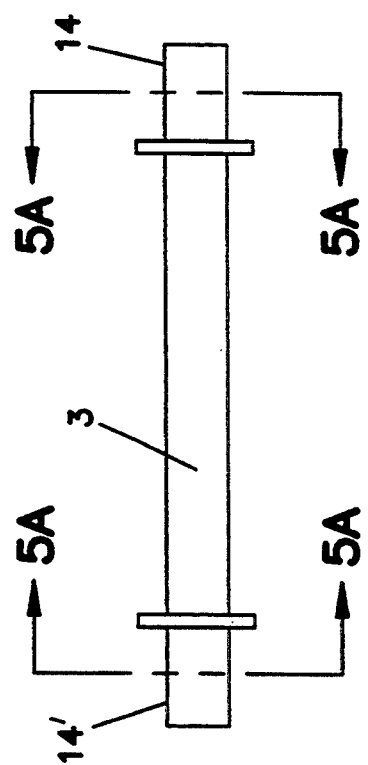
FIG. 5 is a front view of a straight shaft of the present invention.
Figure 6A:
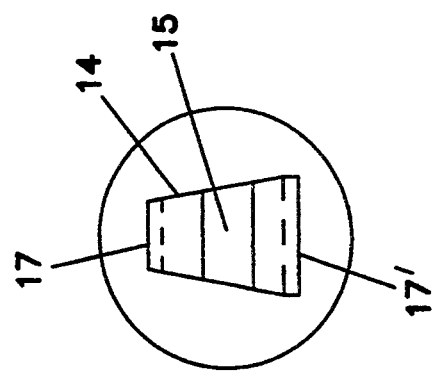
FIG. 6A is an end view of the shaft end taken along line 6A—6A.
Figure 6:
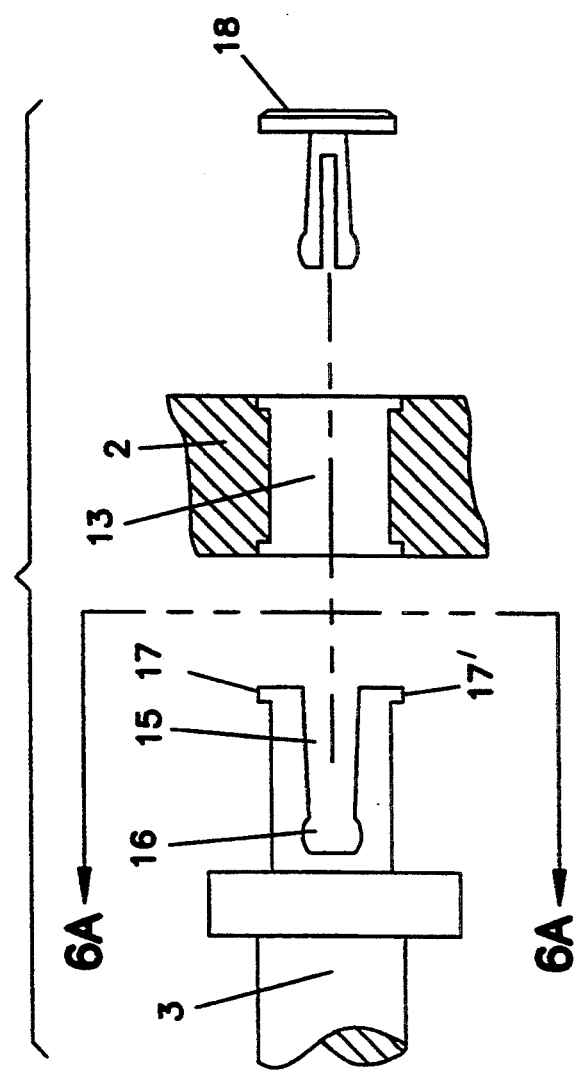
FIG. 6 is an exploded view showing the opening of a shaft end of the present invention.
Figure 8B:
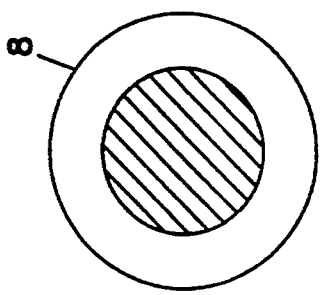
FIG. 8B is a sectional view of the cylindrical end of the joint plunger taken along section line 8B—8B.
Figure 8A:
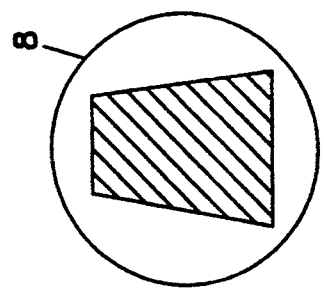
FIG. 8A is a sectional view of the trapezoidal end of the joint plunger taken along section line 8A—8A.
Figure 8:
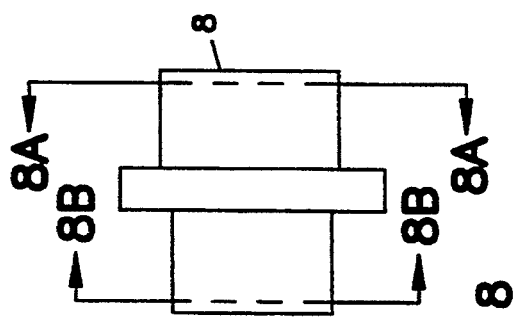
FIG. 8 shows a joint plunger of the present invention.
Figure 9:
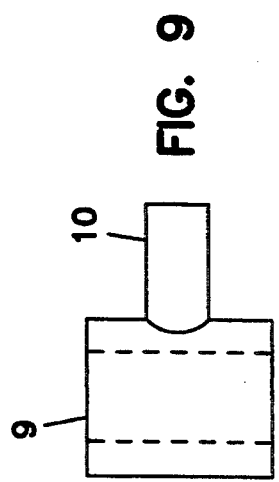
FIG. 9 shows a side elevational view of a ring with a handle of the present invention.
Figure 9A:
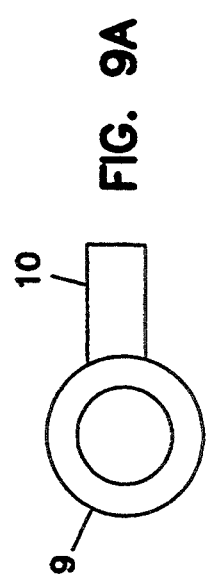
FIG. 9A is a top plan view thereof.

The exercise bike according to the present invention comprises footboards (1), wheels (2) and straight shafts (3). Four straight shafts arranged in two parallel groups and are inserted into the corresponding apertures in the wheel disks. Six wheels are arranged in three longitudinal lines. The shafts and wheels together form a wheel frame, as shown in FIG. 3(b). The middle portion of a straight shaft is cylindrical in shape, and the two footboards are coupled to said round portions of the shafts of the wheel frame through bearings affixed to the bottom of the boards; or, as shown in FIG. 3(c), semi-circular grooves (5) can be provided in the bottom of the footboards, so that said boards can be placed on the middle round portions of the shafts, the lower sides of which are covered by eight half bushes (4), which in turn are fixed to said boards with screws. The shafts can thus rotate freely in the bearings formed by said semicircular grooves and half bushes. As the wheels turn, the two footboards are shifted forwards and backwards, and up and down, respectively.

The shafts are fitted tightly to the wheels by inserting their trapezoid-shaped ends into the corresponding apertures in the wheels. That is to say, in the disk of each wheel are provided two trapezoid-shaped apertures (13, 13'), which are arranged symmetrically and eccentrically with regard to the wheel's center line. The vertical center line of each trapezoid coincides with a center line of the wheel. Both ends of the shaft are also trapezoidshaped (14, 14'), to match said apertures in size. The shafts are inserted, as is proper, into the corresponding wheel apertures in the wheels, to form a wheel frame. A flat slot (15) can be made longitudinally in the shaft's trapezoid end along the center line. The bottom of said slot is a round groove (16) whose diameter is bigger than the width of the slot. The inverted trapezoid opening thus makes the shaft end look like a fork. Lugs (17, 17') are formed at the end of the fork. When the shaft is inserted into an aperture of a wheel, the fork bulges and the lugs click into the edges of said aperture. Since both sides of a wheel are of the same structure and size, a shaft can be inserted from either side of a wheel, for said lugs to click into the stepped edges of an aperture. Then a round-headed flat bolt (18) is blocked into said flat slot (15), to make a tight fit between said shaft and wheels. The bike is now ready for use. The rider stands on both boards and pedals them just as if treading upon waves, causing the footboards to move forwards and backwards, up and down, respectively.

The object of the present invention can also be attained through the following measures.

Figure 7:
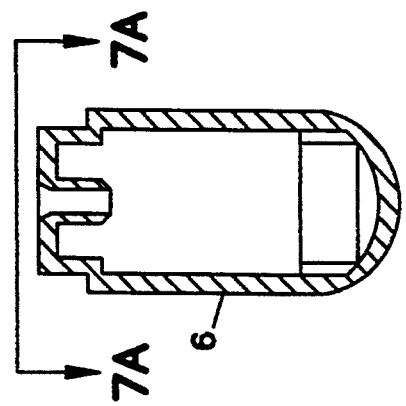
FIG. 7 is a sectional view of a stop bar of the present invention.
Figure 7A:
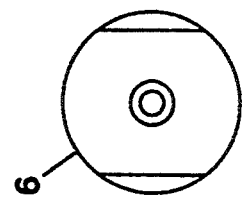
FIG. 7A is a top plan view thereof taken along view line 7A—7A.
Figure 12:
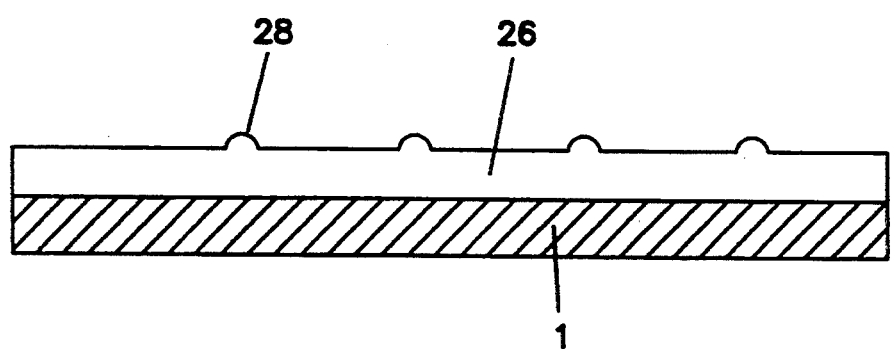
FIG. 12 is a section view of a footboard with a rubber sheet with embedded magneto-therapeutic lumps.

Some safety devices can be added to the abovedescribed bike to make it into a safety-type exercise bike. First, stop screws are affixed at the front and the rear on the bottom of the footboards, to function as stop bars (6), as shown in FIG. 7. Threaded holes are premade in the bottom of the footboards. The height of the stop bars should be such that there is a space of one centimeter from the ground when the footboard is at its lowest point. Thus, no matter whether the footboard tips forward or backward, the stop bar(s) will touch the ground and function as a brake so that the rider would not fall down. Besides, two hand bars can be installed to help the rider adjust the force applied to the bike, so that even very novice beginners can use the exercise bike safely and steadily. Hand bars can be fitted into the trapezoid-shaped apertures of the outer wheels. As previously described, there are two trapezoid-shaped apertures in each outer wheel, one of which two apertures is occupied by a shaft end inserted therein while the other aperture in each of the outer front wheels is unused. Thus, detachable hand bars (7) can be fitted in such unoccupied apertures. Fitting of said hand bars can be performed by means of the trapezoid-shaped end of a joint plunger (8), of which the other end is cylindrical. A ring (9) which has an extending handle (10) is inserted tightly around the cylindrical end of said plunger, and a hand bar can be fitted tightly to said handle. The length of the hand bars should be selected so as to facilitate being held by the rider.

The exercise bike, as described above, can also be turned into a massage-type bike by making notches (12) in the footboard at positions corresponding to the major acupuncture points on the sole of the foot (for instance, the Well Point). To make the notches mechanically sturdy, their lower sides are made to project downwards to that the thickness of a notch is the same as that of the footboard. The notches are embedded with elastic massage lumps (11), which project out from the surface of the board in a half-spherical shape. The lumps are made of rubber or rubber-plastics, and must be able to rotate in the notches. When the rider treads upon the footboards, the massage lumps will perform "rotating massage" upon the acupuncture points of the rider's sole. Another way to make a massage footboard is by sticking a rubber sheet having pre-embedded magnetotherapeutic plastic lumps onto said board within its peripheral edges. Thus, the bike can be used as a massage exercise bike by affixing such rubber sheets onto the footboards. When the rubber sheets are removed, the bike will become an ordinary exercise bike again. In this manner, the same bike can be used either as an ordinary exercise bike, a safety-type bike, or a massagetype bike, thus realizing a multi-purposed function.

Compared with other existing exercise bikes in the prior art, the exercise bike according to the present invention has the following advantages. First, unlike a square aperture which is interchangeable in either direction during assembling, a trapezoid-shaped end of the shaft can be inserted into a trapezoid-shaped aperture in a wheel only in one direction, thus absolutely avoiding incorrect assembly. Just as anyone not familiar with photography can well handle an automatic camera, customers can assemble the bikes on their own without risk of damaging the parts. The manufacturer, on the other hand, can produce the bikes in separate parts and ship them in large quantities to all parts of the world. Further, the bike of the present invention can suit a number of purposes and can be easily changed into a number of types, and is also safe to use.

BEST MODE EMBODIMENTS

Embodiment I: In a plastic wheel, with an outer diameter of 145 mm and a thickness of 20 mm, are made two trapezoid-shaped apertures, and the distance between the centers of both apertures is 60 mm, the vertical center line of both apertures coinciding with the center line of the wheel. The trapezoid has an upper side of 13 mm, a lower side of 16 mm, and a height of 16 mm. Both the upper and lower sides of a trapezoid in either side of a wheel are each provided with a stepped edge of $1 \times 1$ mm, so that both faces of a wheel have the same structures with the same sizes. Next, a straight shaft is molded with engineering plastics, with a total length of 170 mm and a round middle portion of $\Phi$ $17 \times 120$ mm. And both ends of the shaft are trapezoidheaded, 22 mm long, and trapezoid-shaped in cross-section, said trapezoid having an upper side of 13 mm, a lower side of 16 mm, and a distance of 16 mm therebetween. A flat slot is further made axially in the end of the shaft between the upper and lower sides of said trapezoid, such that said flat slot is in the shape of an inverted trapezoid with an upper side of 4 mm and a lower side of 3 mm. The bottom of said slot extends into a round groove of $\Phi$ 6 mm. Thus, the end portion of the shaft becomes fork-shaped. The outer end of the shaft end portion is provided with 1 mm wide lugs, such that when the shaft is inserted into an aperture in a wheel, said fork will bulge and the lugs will click into the stepped edges of said aperture. Further, a round-headed flat bolt is inserted into the flat slot, and affixed tightly. In this manner, six wheels and four straight shafts are used to form a "wheel frame", as illustrated in FIG. 3(b). Lastly, two footboards, 120 mm wide, are fitted so that the bearings at the bottom of the boards are made to hold said straight shafts. Assembly of an exercise bike according to the present invention is thus completed.

Embodiment II: On the basis of Embodiment I, joint plungers (8) are inserted with the trapezoid ends into the unused apertures in both of the front wheels. Rings (9), Φ 18 mm, are fitted tightly around the other cylindrical ends of both plungers. Further, hand bars, 1.2M long, one on the right side and one on the left side of the bike are fitted to the extending handles (10) of said rings. To the bottom of each footboard, stop bars (6), 45 mm high, are fitted, one each at the front end and the rear, the lower ends of said bars being each provided with a hemispherical rubber stopper.

Embodiment III is the same as Embodiment I except that when molding the plastic footboards, notches (12), 5 mm deep, are made in said boards at positions corresponding to the acupuncture points on the sole of the foot. Massage lumps (11) made of rubber or rubber plastics are embedded into said notches. Alternatively, a rubber sheet (26), 10 mm in thickness, the same size as the footboard (1), can be stuck to each board, said sheet being embedded with magneto-therapeutic pieces (28). Thus, the exercise bike is turned into one having magneto-therapeutic boards.

What is claimed is:

1. An exercise bike, comprising two footboards (1), six wheels (2) having apertures, and four straight shafts (3), said four straight shafts being transversely arranged in two parallel groups, inserted into corresponding apertures eccentrically arranged in said wheels, said six wheels being longitudinally arranged in three lines from front to rear, said shafts and wheels forming a wheel frame, said four transversely arranged straight shafts being coupled to the bottom of said footboards by means of bearings, in which a middle round portion of each shaft is loose fitted, said apertures in said wheels being trapezoid-shaped, and, with respect to the centre of each wheel, two trapezoid-shaped apertures (13, 13') being eccentrically arranged, both ends of a straight shaft being trapezoid-headed (14, 14'), corresponding to said trapezoid apertures (13, 13'), and said trapezoid-headed ends (14, 14') being tightly fitted into said trapezoid apertures (13, 13'), and further comprising hand bars (7) fitted to the two front wheels of the bike by means of a joint plunger (8) having one trapezoid-headed end which is fitted into a trapezoid-shaped aperture in a front wheel, and a cylindrical end which is fitted to a ring (9) having an extending handle (10) to which a hand bar (7) is fitted, and stop bars (6) fitted to the bottom of each footboard, one each at the front and rear portions thereof.

2. An exercise bike, as claimed in claim 1, wherein the footboards (1) have notches (12) corresponding to the positions of the major acupuncture points on the sole of the foot, and that said notches are embedded with hemispherical elastic massage lumps (11).

3. An exercise bike, as claimed in claim 1, wherein eight bearings supporting four transversal straight shafts are provided, said bearings being formed by semicircular grooves (5) in the bottom of said boards and eight half bushes (4).

4. An exercise bike, as claimed in claim 1, wherein longitudinally along the centre line of said trapezoid-headed end (14, 14') of the shaft is formed a flat slot (15) in the shape of an inverted trapezoid, the bottom of said flat slot extending into a round groove, and that at each end of the shaft are formed lugs (17, 17'), and the trapezoid-headed end of a shaft is inserted into a trapezoid aperture in a wheel, and a round-headed flat bolt (18) is blocked into each of said flat slot (15).

5. An exercise bike, as claimed in claim 2, wherein eight bearings supporting four transversal straight shafts are provided, said bearings being formed by semicircular grooves in the bottom of said boards and eight half bushes.

6. An exercise bike, as claimed in claim 1, wherein longitudinally along the centre line of said trapezoid-headed end of the shaft is formed a flat slot in the shape of an inverted trapezoid, the bottom of said flat slot extending into a round groove, and that at each end of the shaft are formed lugs, and the trapezoid-headed end of a shaft is inserted into a trapezoid aperture in a wheel, and round-headed flat bolt is blocked into each of said flat slots.

7. An exercise bike, as claimed in claim 2, wherein longitudinally along the centre line of said trapezoid-headed end of the shaft is formed a flat slot in the shape of an inverted trapezoid, the bottom of said flat slot extending into a round groove, and that at each end of the shaft are formed lugs, and the trapezoid-headed end of a shaft is inserted into a trapezoid aperture in a wheel, and round-headed flat bolt is blocked into each of said flat slots.

8. An exercise bike, as claimed in claim 1, further comprising a rubber sheet fitted onto each foot board, said rubber sheet being embedded with magneto-therapeutic lumps.

* * * * *